United States Patent
Li et al.

(10) Patent No.: US 12,411,756 B2
(45) Date of Patent: Sep. 9, 2025

(54) DETERMINATION OF A PRIORITIZED SUBSET OF TEST CASES TO RUN AFTER A SOURCE CODE CHANGE

(71) Applicant: International Business Machines Corporation, Armonk, NY (US)

(72) Inventors: Chun Ling Li, Beijing (CN); Heng Wang, Beijing (CN); Jing Chen, Beijing (CN); Zhi Dan Hao, Beijing (CN); Wei Jiang, Beijing (CN); Cheng Fang Wang, Beijing (CN); Xiao Ling Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 17/701,542

(22) Filed: Mar. 22, 2022

(65) Prior Publication Data
US 2023/0305950 A1    Sep. 28, 2023

(51) Int. Cl.
  G06F 11/3668    (2025.01)
  G06F 11/3604    (2025.01)

(52) U.S. Cl.
  CPC ...... G06F 11/3688 (2013.01); G06F 11/3608 (2013.01)

(58) Field of Classification Search
  CPC .................. G06F 11/3688; G06F 11/3608
  See application file for complete search history.

(56) References Cited

U.S. PATENT DOCUMENTS

| | | |
|---|---|---|
| 6,708,330 B1 | 3/2004 | Moberg et al. |
| 9,311,223 B2 | 4/2016 | Bartley et al. |
| 9,753,845 B1 * | 9/2017 | van Schaik ......... G06F 11/3608 |
| 10,578,673 B2 | 3/2020 | Ranganathan et al. |
| 10,748,068 B2 | 8/2020 | Smith et al. |

(Continued)

FOREIGN PATENT DOCUMENTS

| | | | | |
|---|---|---|---|---|
| CN | 111625444 A | * | 9/2020 | .......... G06F 11/3684 |
| CN | 112749074 A | * | 5/2021 | .......... G06F 11/3684 |
| CN | 114416547 A | * | 4/2022 | |

OTHER PUBLICATIONS

Siddik et al., "RDCC: an Effective Test Case Prioritization Framework using Software Requirements, Design and Source Code Collaboration," 17th International Conference on Computer and Information Technology (ICCIT), 2014, pp. 75-80.

(Continued)

*Primary Examiner* — Qing Chen
(74) *Attorney, Agent, or Firm* — Zilka-Kotab, P.C.

(57) ABSTRACT

A computer-implemented method according to one embodiment includes updating code segments of source code to include predetermined code pieces. The updated code segments are configured to output information about associated test cases upon the test cases being run. The method further includes running the test cases, and subsequent to a change being made to the source code, determining a prioritized subset of the test cases. The prioritized subset of the test cases is run. A computer program product according to another embodiment includes a computer readable storage medium having program instructions embodied therewith. The program instructions are readable and/or executable by a computer to cause the computer to perform the foregoing method.

19 Claims, 10 Drawing Sheets

(56) References Cited

U.S. PATENT DOCUMENTS

| | | | | |
|---|---|---|---|---|
| 11,513,944 | B1* | 11/2022 | Oguara | G06F 11/3692 |
| 2014/0351793 | A1* | 11/2014 | Bartley | G06F 11/3676 |
| | | | | 717/124 |
| 2016/0034375 | A1* | 2/2016 | Sinha | G06F 11/3692 |
| | | | | 717/131 |
| 2017/0371763 | A1* | 12/2017 | Haiderzaidi | G06F 9/454 |
| 2019/0196950 | A1 | 6/2019 | Ranganathan et al. | |

OTHER PUBLICATIONS

Alkawaz et al., "A Survey on Test Case Prioritization and Optimization Techniques in Software Regression Testing," IEEE 7th Conference on Systems, Process and Control (ICSPC), Dec. 2019, pp. 59-64.

Cast, "The Benefits of Early Defect Detection in Software Development," CAST, 2021, 5 pages, retrieved from https://www.castsoftware.com/glossary/early-defect-detection on Oct. 29, 2021.

Prasad et al., "A Binary Rewriting Defense against Stack based Buffer Overflow Attacks," USENIX Annual Technical Conference, General Track, Jan. 2003, pp. 1-13, retrieved from https://www.semanticscholar.org/paper/A-Binary-Rewriting-Defense-Against-Stack-based-Prasad-Chiueh/9bf9450a1b4768adfabc098c869b2028ccdc0de7.

Techopedia, "Automated Regression Testing," techopedia, 2022, pp. 1-10, retrieved from https://www.techopedia.com/definition/30418/automated-regression-testing#:~:text=Automated%20regression%20testing%20is%20a,within%20a%20regression%20testing%20methodology.

* cited by examiner

600

Code piece{digest 111111, ....} B1{int i = 1;}

Code piece{digest 222222, ....} B2{int j = 1;}

Code piece{digest 333333, ....} B3{int m = 1;}

Code piece{digest 111111, ....} B1{int i = 1;}

Code piece{digest new-digest-value-of-B2 123456, ....} B2{int j = 100;}

Code piece{digest 333333, ....} B3{int m = 1;}

FIG. 6B

DETERMINATION OF A PRIORITIZED SUBSET OF TEST CASES TO RUN AFTER A SOURCE CODE CHANGE

BACKGROUND

The present invention relates to automated regression testing, and more specifically, this invention relates to determining a prioritized subset of test cases to run after a source code change to achieve testing efficiencies.

Automated regression testing involves testing software after the software has been changed or updated. This testing is typically performed subsequent to the change or update being made but before a release of the software, e.g., as a new part software, as an update, as part of a big in the software being fixed etc. This way, the existing functionality is tested to ensure that quality assurance is not impacted as a result of the software change or update. Many conventional software companies use Agile in development in order to quickly release new features and/or quickly respond to customer requests.

SUMMARY

A computer-implemented method according to one embodiment includes updating code segments of source code to include predetermined code pieces. The updated code segments are configured to output information about associated test cases upon the test cases being run. The method further includes running the test cases, and subsequent to a change being made to the source code, determining a prioritized subset of the test cases. The prioritized subset of the test cases is run.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A depicts code of an application before a change, in accordance with one embodiment.

FIG. 6B depicts code of the application of FIG. 6A after a change is made.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a prioritized subset of test cases to run after a source code change to achieve testing efficiencies.

In one general embodiment, a computer-implemented method includes updating code segments of source code to include predetermined code pieces. The updated code segments are configured to output information about associated test cases upon the test cases being run. The method further includes running the test cases, and subsequent to a change being made to the source code, determining a prioritized subset of the test cases. The prioritized subset of the test cases is run.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
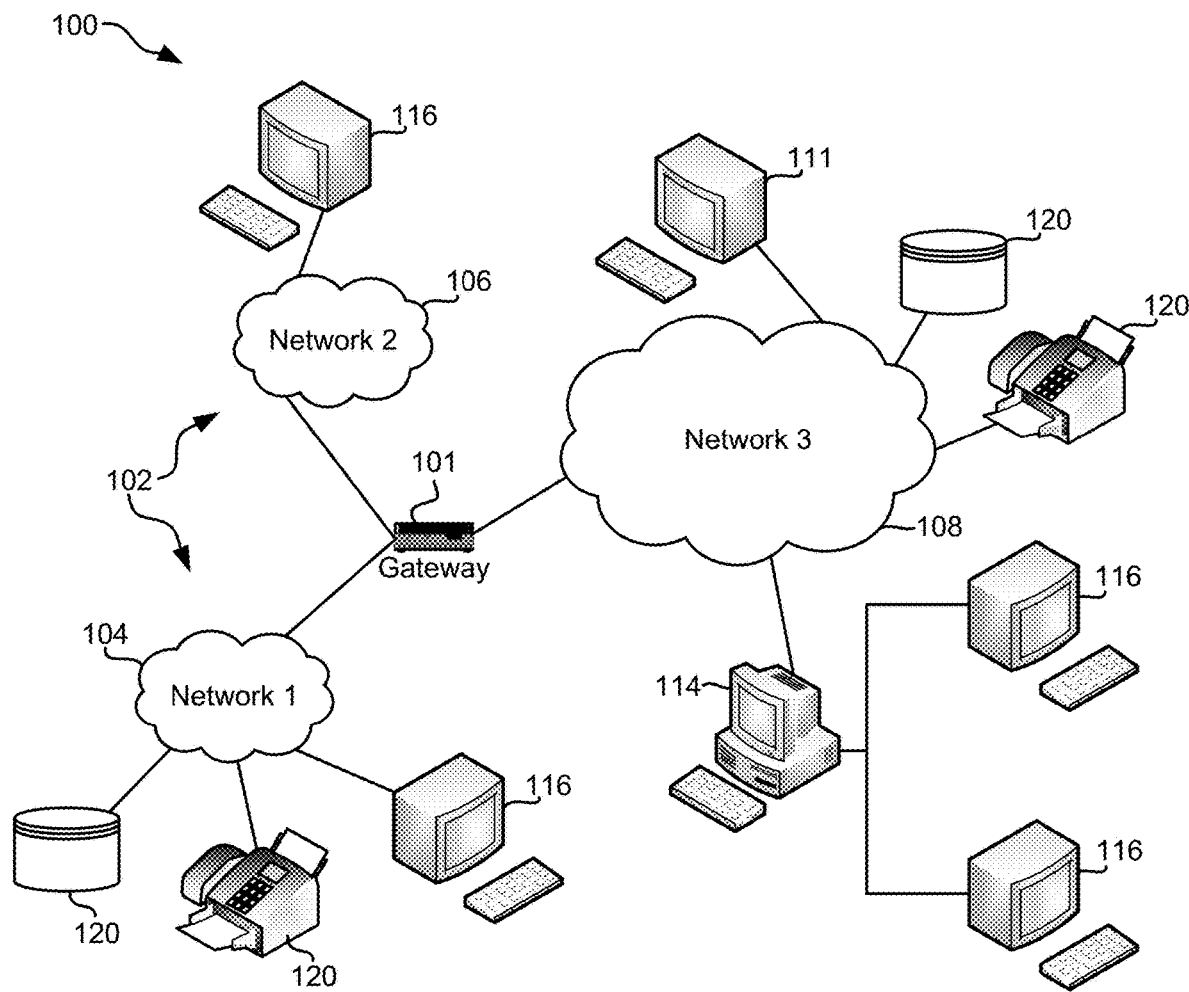
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
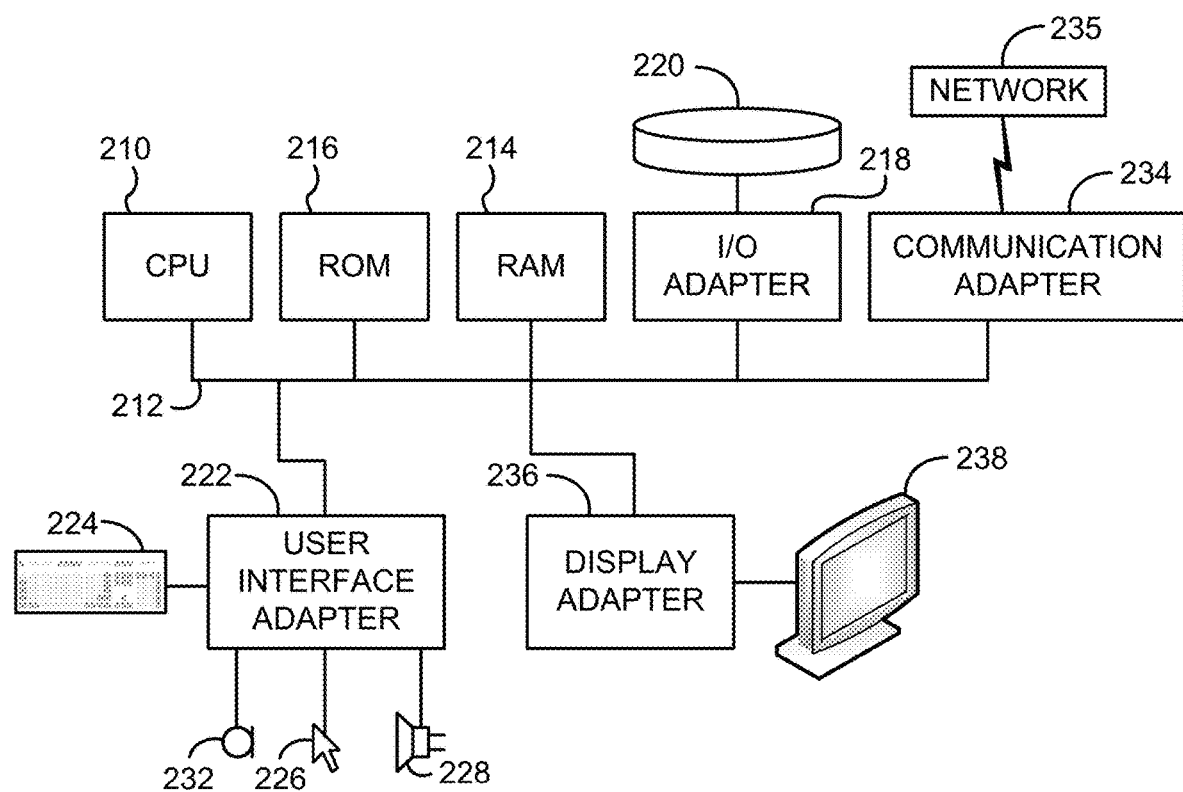
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

As mentioned elsewhere herein, automated regression testing involves testing software after the software has been changed or updated. This testing is typically performed subsequent to the change or update being made but before a release of the software, e.g., as a new part software, as an update, as part of a big in the software being fixed etc. This way, the existing functionality is tested to ensure that quality assurance is not impacted as a result of the software change or update. Many conventional software companies use Agile in development in order to quickly release new features and/or quickly respond to customer requests. In order to test on all code changes, an attempt may be made to use a regression automation bucket that covers all features. However, for relatively large and/or complex projects, some tests cannot be automated. For example, in some environments, one round of regression takes a relatively long time to complete, e.g., one week to even several weeks. This is problematic because offering teams typically do not want regression testing to extend past one or two days. This is because customers typically request that release times be sped up.

Within production development and continuous integration, a test cases bank continues to grow. For example, in some conventional testing scenarios it may take four to seven days on average to finish a test, with thousands or more test cases being performed during this period. Developers are forced to wait until this testing is finished before releasing a product or update. It should be noted that during this conventional testing, regression tests sometime fail within the last hour. The developers thereafter must fix the issue and re-run the entire test. This sometimes adds additional days of testing. In addition to this waiting period, it may be difficult to identify a defect on a server side when the test cases are running. Where the testing is performed on security related software, for some security vulnerabilities, extensive amounts of human resources are spent, and a very long period of time is taken to fix security vulnerabilities. Due to this long period of time consumed in running test cases using conventional techniques, software and services of customers are exposed without enough protection.

In sharp contrast to the various deficiencies described above, various embodiments and approaches described herein aim to identify and prioritize efficient test cases in order to ensure that defects in code are discovered relatively early in a testing process. This way, test cases that would otherwise fail in a latter stage of running test cases are prioritized for performing in a subset of cases that are performed first. This reduces an amount of time that discovering these defects takes. More specifically, a subset of a test bucket is determined dynamically for every feature/function/component change, e.g., dynamic outcomes. Thereafter only the pipelines that may be affected by the new code are covered, while meanwhile the pipelines that are determined to not be capable of being sped up are at least initially skipped. This offers an effective balance between handling the risk associated with not testing all pipelines and the benefit of release being able to satisfy customer time tolerances.

Figure 3A:
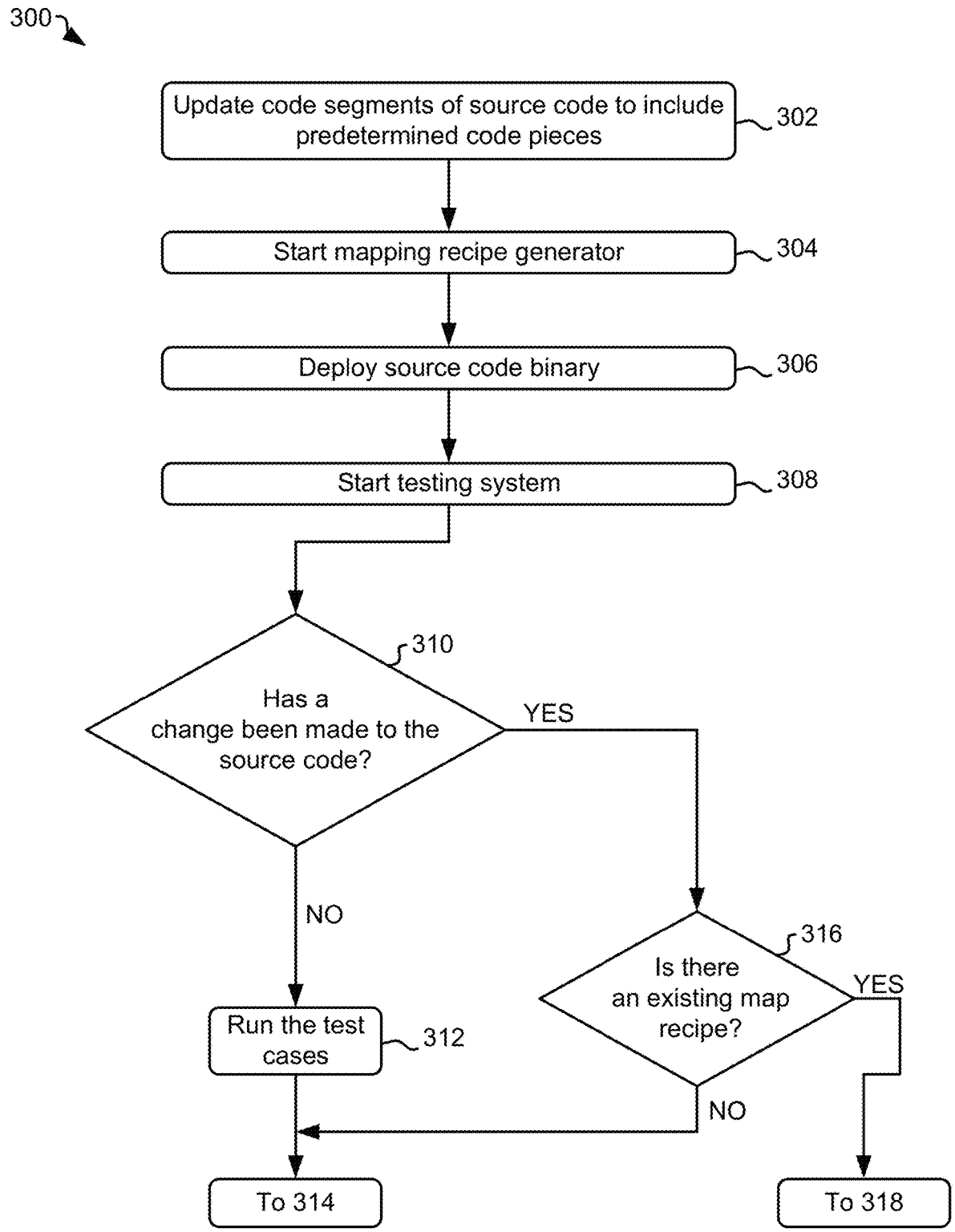
FIG. 3A is a flowchart of a method, in accordance with one embodiment.
Figure 3A:
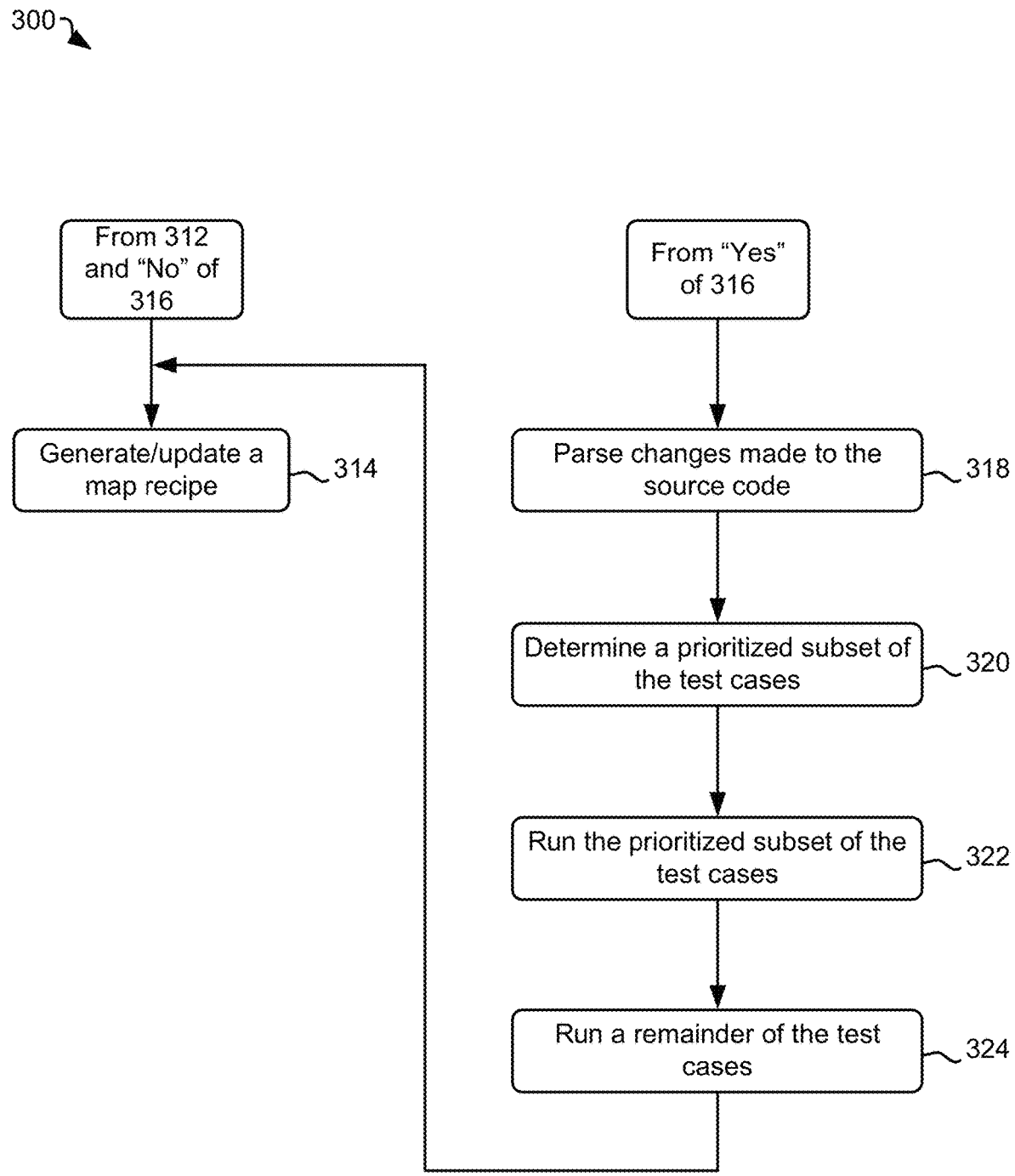

Now referring to FIG. 3, a flowchart of a method 300 is shown according to one embodiment. The method 300 may be performed in accordance with the present invention in any of the environments depicted in FIGS. 1-7 among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Method 300 may preferably be performed in an environment that includes a compiler/linker that includes a code segment update module. The code segment update module may be configured to update one or more code segments of a predetermined source code that is used by a testing system of the environment. Operation 302 of method 300 includes updating, e.g., inserting, code segments of source code to include predetermined code pieces. The code segment update module may be configured to additionally and/or alternatively compile and link a gathering library/package to source code and update the binary of the source code to insert a prolog/epilog code piece in the prolog/epilog of a function. This may be used to resolve the test cases and the tested source locates in a different physical/virtual machine or container. Furthermore, the code segment update module may be configured to insert a basic block code piece in each basic block of a function. Test cases may utilize a case inter/command to deliver case info to a map recipe generator of the environment in response to the updating performed by the code segment update module.

Figure 3B:
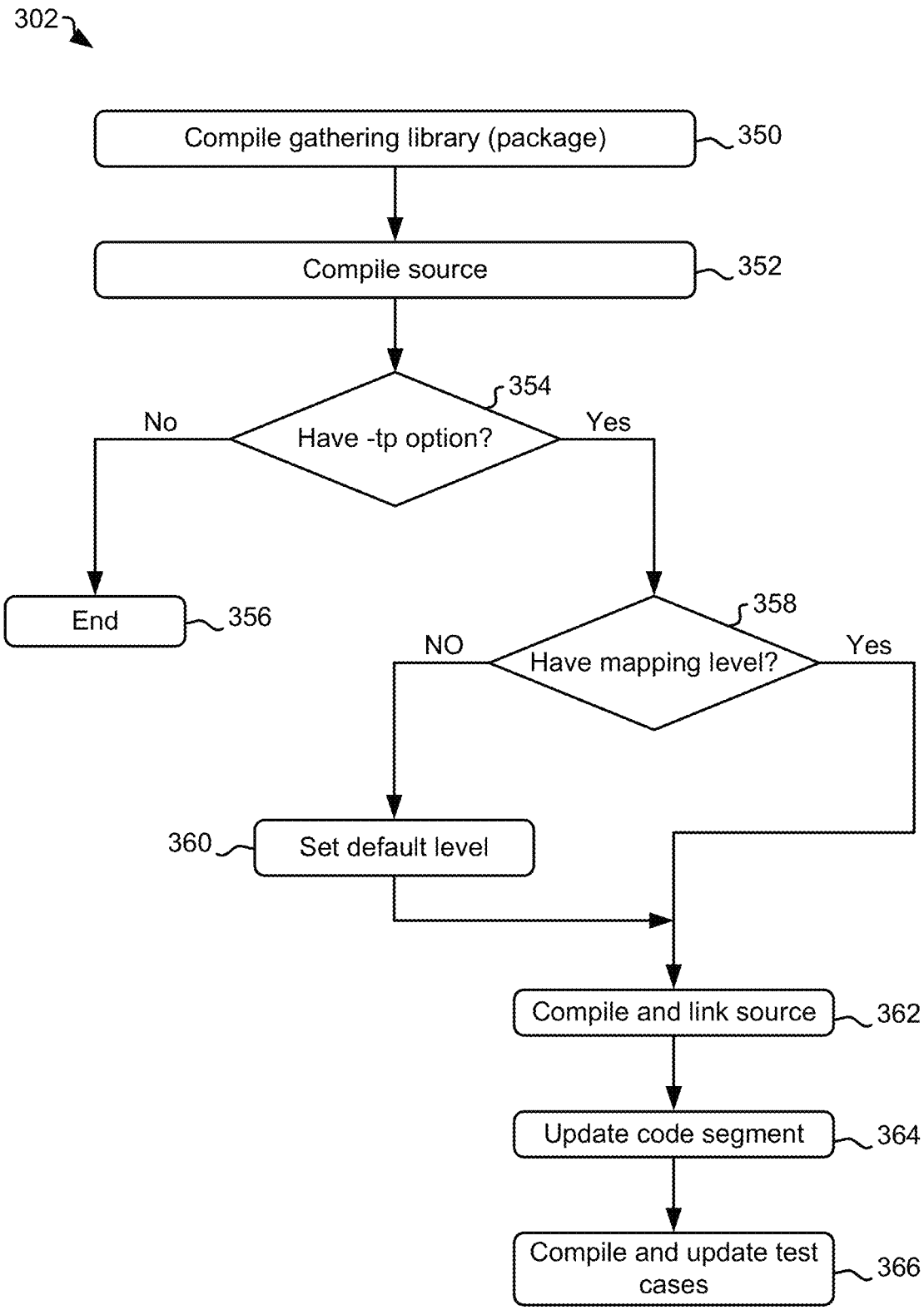
FIG. 3B is a flowchart of sub-operations of an operation of the flowchart of FIG. 3A.

Looking to FIG. 3B, exemplary sub-operations are illustrated in accordance with one embodiment, one or more of which may be used to perform operation 302 of FIG. 3A. However, it should be noted that the sub-operations of FIG. 3B are illustrated in accordance with one embodiment which is in no way intended to limit the invention.

Sub-operation 350 includes compiling a gathering library, e.g., a gathering library package. The gathering library may be of a known type and may be included the environment that includes the compiler/linker of FIG. 3A. In some approaches the gathering library includes a basic block method that includes a basic block digest and a streaming stub. The gathering library may additionally and/or alternatively include a prolog/epilog method that includes a method digest and a non-blocking streaming stub, e.g., the non-blocking streaming stub does not block normal execution of a basic block of the source code. The gathering library may additionally and/or alternatively include a case interface/command that includes a method information and a streaming stub. The basic block method and the prolog/epilog method of the gathering library may be configured to communicate with sources, which may include source code, that is in communication with the code segment update module of the compiler/linker of the environment of FIG. 3A. Furthermore, the case interface/command of the gathering library may be in communication with cases of the environment of FIG. 3A that are in communication with a map recipe generator module, e.g., hereafter "map recipe generator," of the environment of FIG. 3A.

In operation 352 the compiler compiles the source code, e.g., the source code that is to be tested in method 300. Known compiling techniques may be used to compile the source code.

In sub-operation 354 it is determined whether a testing priority, e.g., —tp, option is enabled. This option may be checked by the compiler in some approaches. For context, the testing priority option may be enabled where the source code is subject to and/or scheduled to be changed, e.g., updated by a developer device, at some point. As will become apparent to one of ordinary skill in the art upon reading various descriptions herein, source code that is changed may be tested to determine a priority of performing testing test cases associated therewith. Accordingly, the testing priority option may be enabled in response to a determination that the source code is subject to and/or scheduled to be changed. In response to a determination that the testing priority option is not enabled, e.g., see "No" logical path of sub-operation 354, the method 300 optionally stops, e.g., see "End" at sub-operation 356. In contrast, in response to a determination that the testing priority option is enabled, e.g., see "Yes" logical path of sub-operation 354, it is determined whether a mapping level exists, e.g., see sub-operation 358. It may be prefaced that a mapping level may be used by the compiler to update the code segments. In response to a determination that a mapping level does not exist and/or has not been provided by an end-user, e.g., see "No" logical path of sub-operation 358, a predetermined default mapping level may be set, e.g., see sub-operation 360. The mapping level may be a multiple mapping level and may include one or more of a method level, an essential basic block level and a line level. In response to a determination that a mapping level does exist, e.g., see "Yes" logical path of sub-operation 358, the compiler compiles and links the source code to the mapping level, e.g., see sub-operation 362. This ensures that changes to code segments of the source code are recognized within the mapping.

Sub-operation 364 includes causing the compiler to update the code segment based on the mapping level. Known techniques for causing a compiler to update a code segment may be utilized. It should be noted that although sub-operation 364 refers to updating a single code segment, in some approaches a plurality of code segments of the source code may be updated. In some approaches updating the code segments includes, for each function, injecting an identifier detector to print function information. As a result of the updating, the updated code segments may be configured to output information, e.g., print function information such as runtime information, about associated test cases upon the source code and the test cases being run. It should be noted that in some approaches, a test case may be associated with information that is received while the test case is being run. In some approaches, updating the code segments of source code includes inserting each of the predetermined code pieces ahead of, e.g., and thereby positioned to be executed before, an existing block of the source code. Each of the predetermined code pieces may thereby be configured to be performed before an associated one of the existing blocks during the running of the test cases. In another approach, updating the code segments of source code may include adding each of the predetermined code pieces ahead of a different existing block of the source code. This updating may additionally and/or alternatively include inserting a prolog/epilog code piece in the prolog/epilog of a function of the code segments and also insert a basic block code piece in and/or ahead of each basic block of the function. The code segments that are inserted may each contain a basic block digest, a method digest, a basic block mCount, and a method call stack. The basic block digest refers to the digest value of the basic block intermediate code. The basic block mCount refers to the count that the basic block is invoked. Furthermore, the method call stack refers to the call stack of the method that the basic block belongs to. Accordingly, the updated code segments may be configured to output information that includes essential basic block, call stack, mCount, invoke count, etc. The mCount, method call stack, and non-blocking streaming stub are preferably used to keep the runtime info and to communicate with the map recipe generator in a running, e.g., testing, stage of method 300, e.g., see operations 304-324.

A basic block method and a prolog/epilog method may both take action in a compiling stage of method 300, e.g., see sub-operation 362 of FIG. 3B, and a running, e.g., testing, stage of method 300, e.g., see operations 304-324. In some preferred approaches, the basic block method and a prolog/epilog method may be used to determine whether a change has been made to the source code after the code segments of the source code are updated to include the predetermined code pieces. For example, the basic block method and a prolog/epilog method may contain a basic block digest, e.g., a basic block intermediary language digest, and method digest, e.g., a method intermediary language digest, which record source code changes base on one or more of the functions being executed. In some approaches the value of the basic block's digest are the predetermined code pieces and may be generated and inserted ahead of the basic block with and/or when an application is compiled by the compiler. The value of the digest may be initially set as a predetermined value and, as will be described in greater detail elsewhere herein, may be used for indicating which basic blocks are changed during a running, e.g., testing, stage of method 300, e.g., see operations 304-324.

Sub-operation 366 includes compiling and updating the test cases. In some approaches the compiler may compile the test cases by utilizing a command that the gathering library provides. In an alternate approach, the test cases may be compiled by utilizing a command that the gathering library provides in response to receiving an instruction from a device of an end user.

With reference again to FIG. 3A, with the code segments of source code updated to include the predetermined code pieces, the test cases may be tested. In some approaches, in order to test the test cases, a map recipe generator may be started, e.g., see operation 304. The map recipe generator is preferably included in the environment that includes a compiler/linker. Furthermore, the map recipe generator may include a daemon that is configured to collect and receive information such as statistics from a module that contains the updated test cases. As will be described in greater detail elsewhere herein, e.g., see operation 314, these statistics may be used by the map recipe generator to generate a map recipe which may be used by the testing system to prioritize test cases.

Operation 306 includes deploying source code binary, e.g., binary of the source code. The source code binary may be deployed using known techniques, and in some approaches includes source code binary that was updated as a result of the update performed to the code segments of source code, e.g., see operation 302. In some other approaches, at least some, of the deployed source code binary is not of code segments that were updated to include the predetermined code pieces.

A testing system of the environment is caused to be started in order to test test cases associated with the updated code segments of the source code, e.g., see operation 308. In some approaches, the testing system may be caused, e.g., issued a start instruction, to be started in response to a determination that the code segments of source code have successfully been updated to include the predetermined code pieces. In another approach the testing system may be caused to be started in response to a determination that the mapping recipe generator has started and/or the source code binary has been deployed.

It is determined whether a change been made to code segment(s) of the source code, e.g., see decision 310. It should be noted that this change to the source code is different than the updates made to the code segments of source code performed in operation 302 of method 300. This change in the source code, in some approaches, includes developer source code changes such as changes that are a part of an update package that is to be delivered to customers. In another approach the change may additionally and/or alternatively include a change to predetermined information that is associated with the source code and received during execution, e.g., a mCount, a method call stack, a digest, etc.

A time in which changes are made to the code segment(s) of the source code are made may vary depending on the approach. For example, in some approaches these changes to the source code are made after a most recently performed run of the test cases. In some other approaches these changes to the source code may additionally and/or alternatively be made subsequent to the code segments of the source code being updated to include the predetermined code pieces. In yet some further approaches, these changes to the source code may additionally and/or alternatively be made in repose to, and at any point in time after, a request to update a customer application that is associated with the source code is received. Various techniques for determining whether a change has been made to the source code will now be described below.

In some preferred approaches, the gathering library (package) may provide a basic block method, prolog/epilog method and case interface/command that can be implanted into the source code that is to be tested. When executed the methods may record the runtime info and communicate this information, e.g., outputting the runtime information, with the map recipe generator. As mentioned elsewhere above, the basic block method, prolog/epilog method may contain a basic block digest and method digest to record code changes. Accordingly, in some preferred approaches, at least one value of a basic block digest is used to determine whether a change been made to code segment(s) of the source code. This is because when a change is made to the code of an application, e.g., such as a change associated with a developer update, the basic blocks are changed. The digest value of the changed basic block is different from the previous digest value before the change. These changes may in some approaches additionally and/or alternatively be identified by comparing information received from a most recently performed testing sequence with information received from a previously performed testing sequence, e.g., comparing information of digests of each sequence. For example, the value of the digest may be initially set as a predetermined value, e.g., the value zero. The digest value of the basic block may thereafter be changed to a value of one upon a change being made to code segment(s) of the source code. In such an approach determining whether a change been made to code segment(s) of the source code includes determining whether the predetermined value has changed from zero. In one approach, a known technique for comparing an initial and a subsequent value may be used to determine whether the predetermined value has changed.

For context, it should be noted that it may be determined whether a change been made to the source code because changes to source code may result in one or test cases failing while running the test cases. One purpose for running the test cases is to troubleshoot and correct test cases that fail as a result of the changes being made to the source code before the source code and/or changes thereof are released to a customer. Test cases associated with a change made to the source code may be more likely to fail during running than test cases that are not associated with the change made to the source code. Accordingly, various approaches described herein preferably identify test cases associated with a change made to the source code and running these test cases before running other test cases. This way, a time that is consumed in running the test cases is likely to be reduced because scenarios in which test cases associated with the change made to the source code end up being run and failing relatively late in a testing sequence are avoided. More specifically, as a result of running test cases that are most likely to fail first, in the event that one or more of the test cases end up failing as a result of a defect in the source code, the defects are able to be quickly identified. By identifying these defects relatively early in a testing cycle, a cause of the failure is able to be quickly identified, corrected, and retested.

In response to a determination that a change has not been made to code segment(s) of the source code, e.g., as illustrated by the "No" logical path of decision 310, the test cases are run, e.g., see operation 312. Note that in some approaches, the test cases are not run in a prioritized order in operation 312. This is because in such an approach a subset of test cases that are more likely to fail than other test cases, e.g., "relevant test cases," is not identified as it is determined that a change has not been made to code segment(s) of the source code. In some other approaches, the test cases may be run in an order that includes running test cases in increasing expected runtime, e.g., shorter test cases first. This way multiple test cases are performed initially rather than a test case that takes relatively long to perform.

In response to a determination that a change has been made to code segment(s) of the source code, e.g., as illustrated by the "Yes" logical path of decision 310, it may be determined whether there is an existing map recipe that can be used to parse the changes made to the code segment(s), e.g., see decision 316. In some approaches, such as prior to an initial run of the test cases and/or prior to the test cases being run after the code segments of source code are updated to include predetermined code pieces, a map recipe may not exist and the test cases may be run without determining a prioritized subset of the test cases associated with the changes made to the code segment(s) for running before other test cases, e.g., as illustrated by the "No" logical path of decision 316 proceed to operation 312. This allows source code functions to be mapped to test cases by recording and analyzing the test cases running process.

Subsequent to running the test cases in operation 312, a map recipe is generated, e.g., see operation 314. The map recipe is in some approaches generated based on the information about associated test cases upon the test cases being run. For example, subsequent to running all the test cases, a special log with function information may be generated. In one approach a testing report that includes runtime information may be generated and the results of the report may be evaluated to generate the map recipe. In another approach, the log may be analyzed, and the functions may be mapped to test cases. A mapping set with functions to test cases may also be generated. Each function will temporarily map a subset of test cases. The runtime information may include runtime information such as essential basic block, call stack, and mCount information. For example, the mCount, method call stack, and non-blocking streaming stub may be used to keep the runtime info and communicate with, e.g., output the information, the map recipe generator during a testing stage of the test cases. While the test cases and source code binary are running, source code binary, e.g., updated in operation 302, may output every method digest, basic block digest and mCount to a mapping collector module. Furthermore, the test cases may send the case method information to the mapping collector module. Accordingly, method 300 optionally includes receiving information about the test cases. The map recipe generator collects the information and generates a map recipe, e.g., a case-method/basic-block map recipe and/or a case-method/source-method map recipe. The map recipe in one approach contains two maps. A first of the maps is a case-method/basic-block map recipe corresponds to a basic block mapping level. A second of the maps is a case-method/source-method map recipe, which corresponds to a basic method mapping level. Both of the maps can be used by testing system to determine a test case with a change and to prioritize the test cases. To provide some background, a method block usually may be divided into serval basic blocks, e.g., see B1-B3 and B5-B7 of Sample Code (1) below.

```
Method A1 ( ) {
    B1
    B2
    B3
}
Method A2 ( ) {          Sample Code (1)
    B5
    B6
    B7
}
```

A difference between the two maps is that the case-method/basic-block map is more accurate and specific than the case-method/source-method map. In the event that a mapping level is set to basic block, the map recipe will contain case-method/basic-block map information, which is more detailed and specific than the case-method/source-method map. Again, the maps can be used by a testing system to determine a test case with a change and to prioritize the test cases. Because the case-method/basic-block map is more accurate than the case-method/source-method map, it will consume more CPU time, which translates to more waiting time by the end user. Accordingly, in some approaches, the case-method/source-method map may be preferred in time constrained approaches in order to improve testing runtimes.

Subsequent to a map recipe being generated, the map recipe may be used in a next iteration of determining whether there is an existing map recipe, e.g., see decision 316. For example, assuming that it is determined that a change has been made to the source code, e.g., as illustrated by the "Yes" logical path of decision 310, it may be determined that a map recipe does exist, e.g., as illustrated by the "Yes" logical path of decision 316, provided that the map recipe has been generated.

Subsequent to a change being made to the source code, e.g., by developers of the source code, a prioritized subset of the test cases may be determined. In some approaches, changes of the source code may be parsed to determine a prioritized subset of the test cases. Operation 318 includes parsing changes made to the source code. For context, the changes in source code may be parsed to identify test cases that are associated with the changes in the source code. In some preferred approaches, the map recipe may be used by testing system to parse the changes made to the source code in order to identify test cases associated with the changes in the source code. For example, parsing the changes made to the source code may include identifying each of the test cases associated with changes made to source code. In one approach this identification process may include determining basic blocks that have had a change in digest value and using the mapping to determine which test cases map to the basic blocks that have had a change in digest value. In another approach this may include determining which test cases were running while information used to determine that a change has been made to the source code is received. In another approach, by searching these changed basic blocks from <case, basic block>, associated test case(s) may be located.

A prioritized subset of the test cases may be determined, e.g., see operation 320. In preferred approaches the prioritized subset of the test cases includes test case(s) that are associated with the change made to the source code.

In some approaches the change made to the source code is made to a function of the source code. Depending on the approach the change may be made to an existing function of the source code, e.g., such as a function of the source code that is included in the source code before the change is made to the source code, or a new function of the source code, e.g., such as a function of the source code that is included in the source code as a result of the change made to the source code. In one approach in which the function is an existing function of the source code, the prioritized subset of the test cases may be test cases that are identified, during parsing of the source code, in the map recipe. A remainder of the test cases that are not identified in the map recipe may be determined to not be associated with the change made to the source code and may be not prioritized. The change made to the source code may additionally and/or alternatively be made to a new function of the source code. In some approaches in which the function is a new function of the source code, method 300 may include identifying a caller of the new function by static code analysis until all possible callers are in the map recipe. The static code analysis may be performed using known techniques. Moreover, the test cases in the map may be identified and the prioritized subset of the test cases may be the test cases that are identified in the map recipe. Static code analysis may additionally and/or alternatively be used to find out a caller function(method), and then find out the caller corresponding cases through the case/method map recipe. These caller corresponding test cases may then be prioritized.

Operation 322 includes running the prioritized subset of the test cases. The test cases in the prioritized subset are preferably run first in a process of running all the test cases of the source code. The testing result may be evaluated, and a recommendation may be output. For example, known troubleshooting techniques may be utilized to determine a fix and/or suggested remedy test cases that fail. The suggested remedy may be output to a device used by a developer.

In some approaches, a remainder of the test cases are run which may include all test cases that are not associated with the change made to the source code and therefore are not of the prioritized subset of the test cases, e.g., see operation 324. Running the remainder of the test cases after the prioritized subset of the test cases thereby fulfills performing a full testing case. The remainder of the test cases are preferably run after running the prioritized subset of the test cases. In some other approaches, the remainder of the test cases may not be run.

The map recipe may be updated, e.g., refreshed, in response to the prioritized subset of the test cases and/or the remainder of the test cases being run, e.g., see operation 314. The map recipe may be updated based on results of running the prioritized subset of the test cases and results of running the remainder of the test cases. The updated map recipe may be used to determine a next prioritized subset of the test cases to run, e.g., subsequent to additional changes being made to the source code. In some approaches the logs of the injection log codes of last test case running may be analyzed. The log codes may be used to complement and refresh the map recipe. In response to identifying function(s) that do not have test cases, a request for input may be output to a predetermined device, e.g., such as a device used by a developer of the source code. In another approach, in response to identifying function(s) that do not have test cases, a predetermined suggestion to add new test cases may be output, e.g., to a device used by a developer of the source code.

There are numerous benefits that are enabled as a result of utilizing the techniques of various embodiments and approaches described herein to establish a subset of prioritized test cases for running before running other test cases. This is useful to developers and enables a code defect to be found in an earlier testing stage, e.g., in the DevOps steps. This also improves a development/test efficiency especially where the test cases and the tested source locates are in different physical/virtual machines or containers. This is because the subset of the test cases includes test cases that are associated with a change that has been made to source code and therefore is more likely to fail during testing than other test cases that are not associated with a change that has been made to the source code. This prevents a testing scenario in which, near a later stage in a testing cycle, e.g., subsequent to about 50% of test cases being run, subsequent to about 75% of test cases being run, subsequent to about 95% of test cases being run, etc., a test case that is associated with a change made to source code since a most recently performed running of the test cases, is run and fails. This testing scenario assumes that at least one test case that is not associated with the change to the source code is performed before the failing test case that is associated with the change to the source code. It should also be mentioned that the code piece added to enable these benefits is non-blocking code, which will not block program execution. Accordingly, the techniques of various embodiments and approaches described herein establish testing efficiencies and reduce an amount of processing that is performed during running of test cases. It should be noted that conventional running of test cases does not utilize the techniques of various embodiments and approaches described herein and in sharp contrast allow test cases associated with changes made to source code to be tested in later stages of running a test case.

Accordingly, the inventive discoveries disclosed herein with regards to determining and running a prioritized subset of test cases proceed contrary to conventional wisdom. These techniques may be particularly useful when implemented into and used directly in IBM high security Z as a Service (ZaaS) products such as IBM Cloud Hyper protect Database as a Service. These techniques may additionally and/or alternatively be used in any IBM productions to improve the Continuous Integration (CI)/Continuous Delivery (CD) process, or in any information technology company product.

Figure 4:
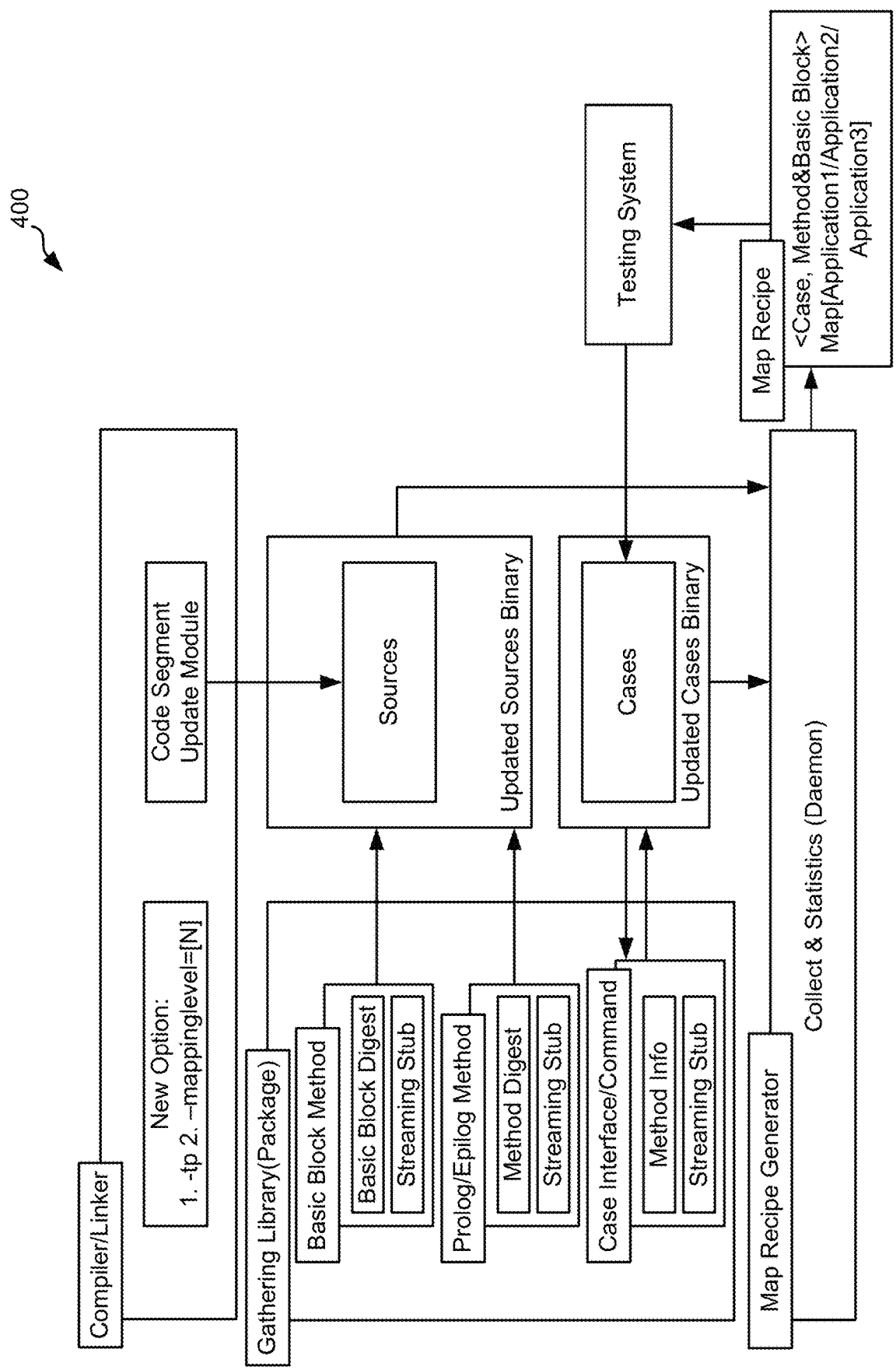
FIG. 4 is an architecture, in accordance with one embodiment.

FIG. 4 depicts an overall architecture 400 in which techniques described in method 300 may be implemented, in accordance with one embodiment. As an option, the present architecture 400 may be implemented in conjunction with features from any other embodiment listed herein, such as those described with reference to the other FIGS. Of course, however, such architecture 400 and others presented herein may be used in various applications and/or in permutations which may or may not be specifically described in the illustrative embodiments listed herein. Further, the architecture 400 presented herein may be used in any desired environment.

The architecture 400 includes a Compiler/Linker that includes a Code Segment Update Module that is configured to update binary of source code, e.g., see Sources. The Compiler/Linker also includes a New Option which may be executed to perform one or more operations described in method 300. The Code Segment Update Module may be configured to additionally and/or alternatively compile and link a Gathering Library (Package) to the source code and update the binary of the source code to insert a prolog/epilog code piece in the prolog/epilog of a function.

In some approaches the Gathering Library includes a Basic Block Method that includes a Basic Block Digest and a Streaming Stub. The Gathering Library may additionally and/or alternatively include a Prolog/Epilog Method that includes a Method Digest and a non-blocking Streaming Stub. The Gathering Library may additionally and/or alternatively include a Case Interface/Command that includes Method Information and a Streaming Stub. The Basic Block Method and the Prolog/Epilog Method may be configured to communicate with the Sources, which may include source code, that is in communication with the Code Segment Update Module. Furthermore, the Case Interface/Command may be in communication with Cases that are in communication with a Map Recipe Generator module that includes a Daemon for collecting information, e.g., see <Case, Method&Basic Block> Map[Application1/Application2/Application3], for a Map Recipe. The Map Recipe is used by a Testing System to prioritize a subset of the test cases for running.

Figure 5A:
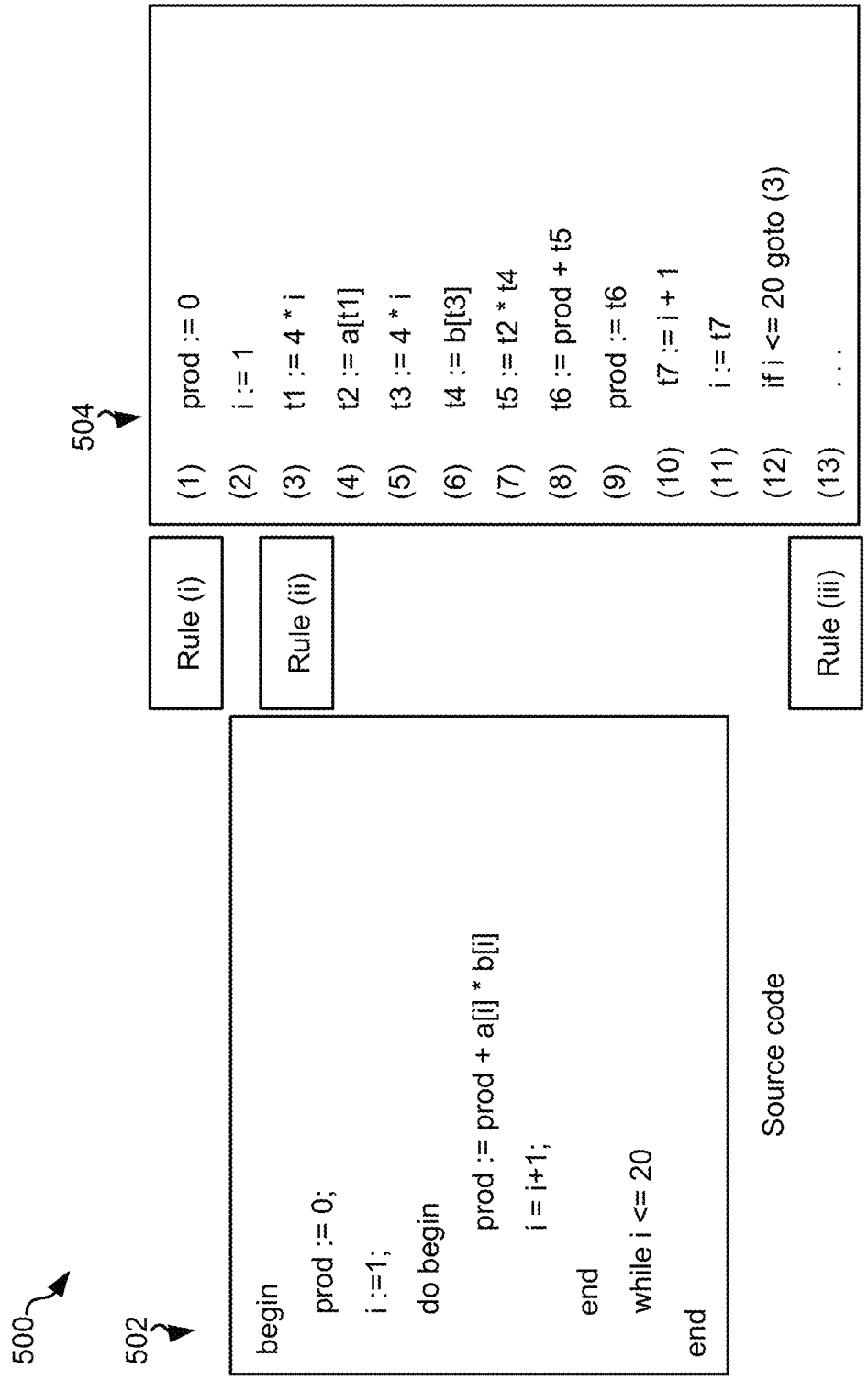
FIG. 5A depicts a sample of source code, in accordance with one embodiment.

FIG. 5A depicts a sample of source code 500, in accordance with one embodiment. As an option, the present sample of source code 500 may be implemented in conjunction with features from any other embodiment listed herein, such as those described with reference to the other FIGS. Of course, however, such sample of source code 500 and others presented herein may be used in various applications and/or in permutations which may or may not be specifically described in the illustrative embodiments listed herein. Further, the sample of source code 500 presented herein may be used in any desired environment.

The sample of source code 500 includes a block of source code 502 that is configured to compute the inner product of two vectors. The block of source code 502 is divisible into at least three basic blocks 504 that each are associated with a different rule, e.g., see Rule (i), Rule (ii) and Rule (iii).

Figure 5B:
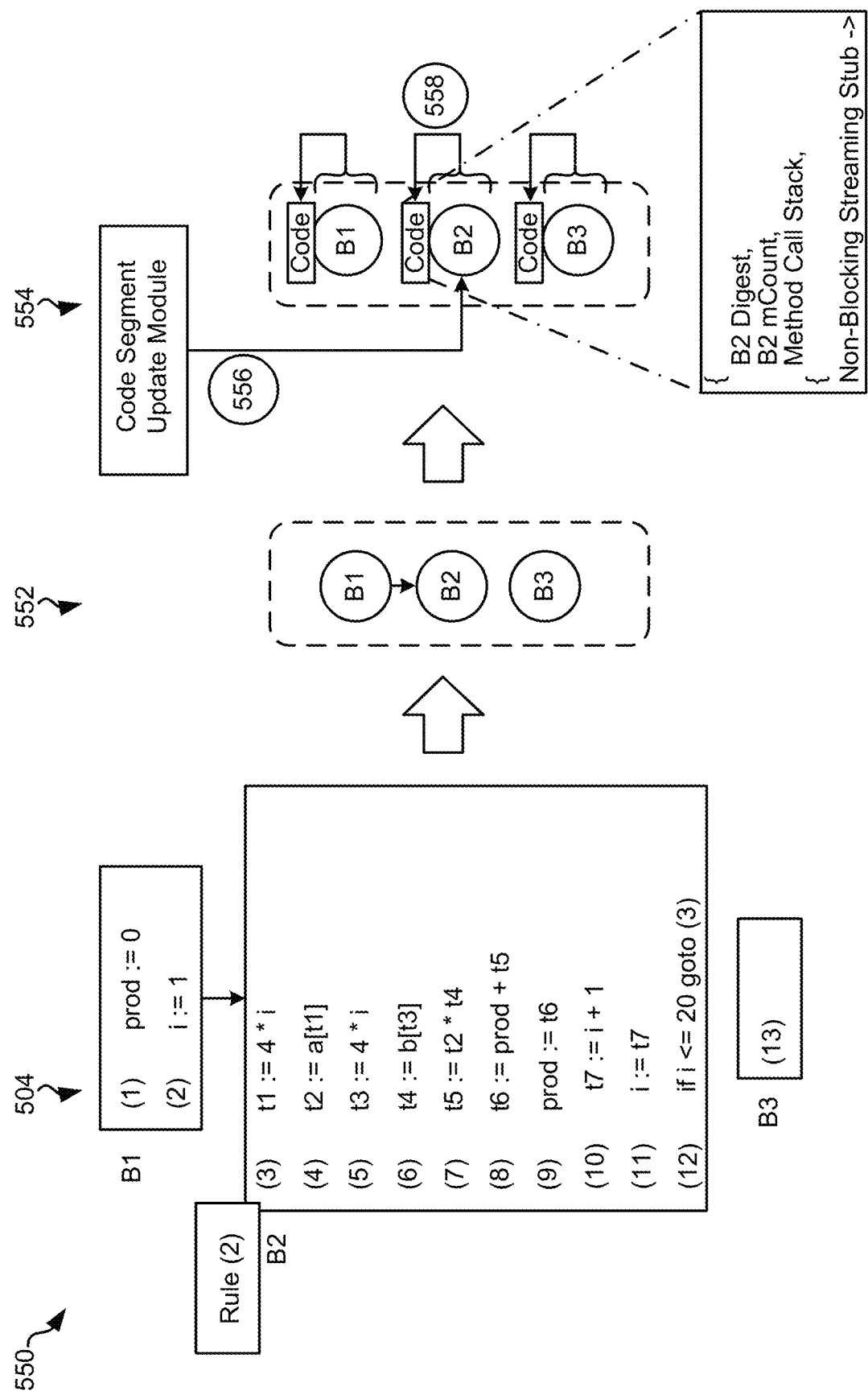
FIG. 5B depicts a detailed breakdown of basic blocks of FIG. 5A, in accordance with one embodiment.

FIG. 5B depicts a detailed breakdown 550 of the basic blocks 504 of FIG. 5A, in accordance with one embodiment. As an option, the present detailed breakdown 550 may be implemented in conjunction with features from any other embodiment listed herein, such as those described with reference to the other FIGS. Of course, however, such detailed breakdown 550 and others presented herein may be used in various applications and/or in permutations which may or may not be specifically described in the illustrative embodiments listed herein. Further, the detailed breakdown 550 presented herein may be used in any desired environment.

In the detailed breakdown 550 the basic blocks 504 are divided into three separate basic blocks before the basic blocks are updated, e.g., see B1, B2 and B3 of division operation 552. In operation 554 of the detailed breakdown 550, code segments of the source code that includes the basic blocks are updated, e.g., see logical path 556 of the Code Segment Update Module, to include predetermined code pieces, e.g., see Code added ahead of the basic blocks in logical path 558. In one approach the Code Segment Update Module includes a compiler that is updated to include new options that include inserting the Code ahead of the existing basic blocks. This allows each of the added Code pieces to be executed before, e.g., see Non-Blocking Streaming Stub, an associated one of the basic blocks B1, B2, B3 is executed. The updated code segments are preferably configured to output information, e.g., see B2 Digest, B2 mCount, and Method Call Stack about associated test cases upon the test cases being run.

FIG. 6A depicts code of an application 600 before a change, and FIG. 6B depicts the code of the application 600 after a change, in accordance with one embodiment. As an option, the present code of the application 600 may be implemented in conjunction with features from any other embodiment listed herein, such as those described with reference to the other FIGS. Of course, however, such code of the application 600 and others presented herein may be used in various applications and/or in permutations which may or may not be specifically described in the illustrative embodiments listed herein. Further, the code of the application 600 presented herein may be used in any desired environment.

Referring first to FIG. 6A, the code of the application 600 is a representational state of code before a change occurs, e.g., such as a change initiated by a device of a developer. Each Code piece of a source code is associated with a different basic block, e.g., see B1, B2 and B3. Furthermore, each Code piece includes a digest that may be used to determine whether a change has occurred to the code piece.

Referring now to FIG. 6B, a change has occurred to the code of the application 600. Specifically, this change has occurred in the second of the Code pieces and is reflected in the digest of the second Code piece changing from "222222" to "123456" and a value of the block code changing from "1" to "100." A test case associated with the second Code piece may be prioritized in a subset of test cases that are performed first.

Figure 7:
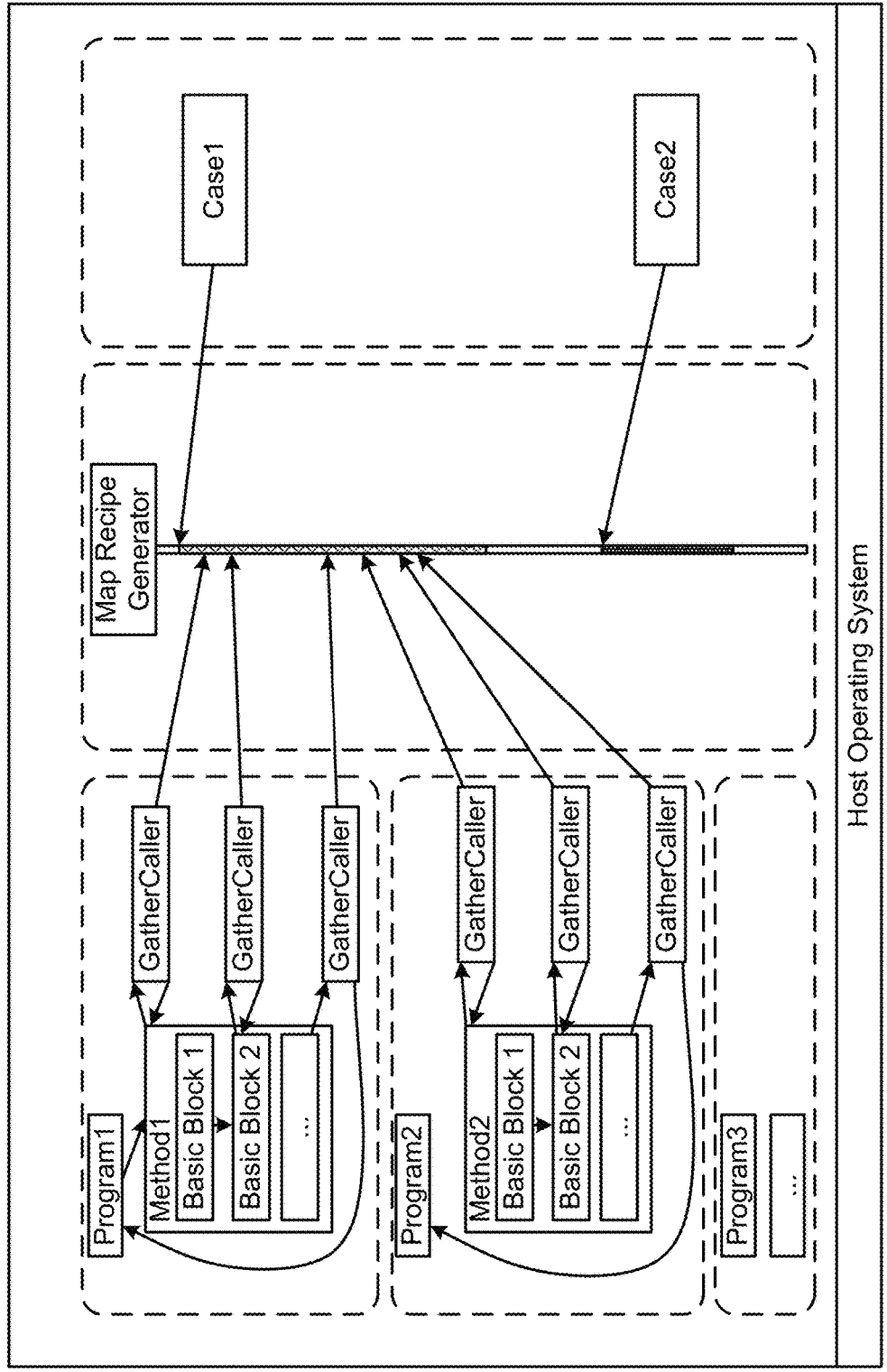
FIG. 7 depicts an architecture of a deployment of prioritizing test cases, in accordance with one embodiment.

FIG. 7 depicts an architecture 700 in which techniques described in method 300 may be implemented, in accordance with one embodiment. As an option, the present architecture 700 may be implemented in conjunction with features from any other embodiment listed herein, such as those described with reference to the other FIGS. Of course, however, such architecture 700 and others presented herein may be used in various applications and/or in permutations which may or may not be specifically described in the illustrative embodiments listed herein. Further, the architecture 700 presented herein may be used in any desired environment.

The architecture includes a Host Operating System that incudes a plurality of programs, e.g., Program1, Program2, and Program3. Each of the programs communicate with an associated application, e.g., see Method1, Method2 and " . . . ", that each have a plurality of basic blocks, e.g., see BasicBlock1, BasicBlock2 and " . . . ". GatherCallers are in some approaches streaming stubs of the programs that are used to communicate information from the applications to a Map Recipe Generator, e.g., Generate <Case, Method&Basic Block>. For example, this information may include runtime information, digests, or any predetermined information that may be used to prioritize test cases, e.g., see Case1 and Case2. In another example, this information originates from predetermined code pieces added ahead of the basic blocks of the methods. More specifically, in one approach the information output to the Map Recipe Generator may be used to determine test cases associated with digests that are determined to include a change. The information may be used by the Map Recipe Generator to generate a case and block map.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    inserting predetermined code pieces before existing code segments of source code,
        wherein the existing code segments of the source code are configured to, based on the insertions, print function information about associated test cases upon the associated test cases being run;
    running the associated test cases;
    subsequent to a first change being made to a function of the source code, determining a prioritized subset of the associated test cases,
        wherein the first change is made in a prolog of the function of the source code; and
    running the prioritized subset of the associated test cases.

2. The computer-implemented method of claim 1, further comprising:
    generating a map recipe based on the function information;
    updating the map recipe in response to the prioritized subset of the associated test cases being run; and
    using the updated map recipe to determine a next prioritized subset of the associated test cases to run.

3. The computer-implemented method of claim 2, wherein the first change includes adding a prolog code piece in the prolog of the function of the source code, wherein a second change includes adding an epilog code piece in an epilog of the function of the source code, and wherein a third change includes inserting basic block code pieces in and/or ahead of basic blocks of the function of the source code.

4. The computer-implemented method of claim 3, wherein the function of the source code is an existing function of the source code, and wherein the prioritized subset of the associated test cases are test cases that are identified in the map recipe.

5. The computer-implemented method of claim 1, wherein the function of the source code is a new function of the source code, and further comprising:
    identifying a caller of the new function of the source code by performing a static code analysis until all possible callers are in a map recipe based on function information; and
    identifying the associated test cases in the map recipe, wherein the prioritized subset of the associated test cases are test cases that are identified in the map recipe.

6. The computer-implemented method of claim 1, wherein the function information returned about the associated test cases is selected from the group consisting of:
    an essential basic block,
    a call stack, and
    a count that the essential basic block is invoked.

7. The computer-implemented method of claim 1, wherein the insertions include the predetermined code pieces being inserted ahead of associated existing basic blocks of the source code such that the predetermined code pieces are positioned to be executed before the associated existing basic blocks of the source code during running of the associated test cases, and wherein the predetermined code pieces and the associated existing basic blocks of the source code are positioned in an alternating pattern within the source code as a result of the insertions.

8. The computer-implemented method of claim 1, further comprising:
    running a remainder of the associated test cases after running the prioritized subset of the associated test cases.

9. A computer program product, the computer program product comprising a computer readable storage medium having program instructions embodied therewith, the program instructions readable and/or executable by a computer to cause the computer to:

insert predetermined code pieces before existing code segments of source code, wherein the existing code segments of the source code are configured to, based on the insertions, print function information about associated test cases upon the associated test cases being run;

run the associated test cases;

subsequent to a first change being made to a function of the source code, determine a prioritized subset of the associated test cases, wherein the first change is made in a prolog of the function of the source code; and run the prioritized subset of the associated test cases.

10. The computer program product of claim 9, the program instructions readable and/or executable by the computer to further cause the computer to:

run a remainder of the associated test cases after running the prioritized subset of the associated test cases.

11. The computer program product of claim 10, the program instructions readable and/or executable by the computer to further cause the computer to:

generate a map recipe based on the function information;

update the map recipe in response to the prioritized subset of the associated test cases being run; and use the updated map recipe to determine a next prioritized subset of the associated test cases to run.

12. The computer program product of claim 11, wherein the first change includes adding a prolog code piece in the prolog of the function of the source code, wherein a second change includes adding an epilog code piece in an epilog of the function of the source code, and wherein a third change includes inserting basic block code pieces in and/or ahead of basic blocks of the function of the source code.

13. The computer program product of claim 9, wherein the function of the source code is a new function of the source code, and the program instructions readable and/or executable by the computer to further cause the computer to:

identify a caller of the new function of the source code by performing a static code analysis until all possible callers are in a map recipe based on function information; and identify the associated test cases in the map recipe, wherein the prioritized subset of the associated test cases are test cases that are identified in the map recipe.

14. The computer program product of claim 9, wherein the function information returned about the associated test cases is selected from the group consisting of:

an essential basic block, a call stack, and a count that the essential basic block is invoked.

15. The computer program product of claim 9, wherein the insertions include the predetermined code pieces being inserted ahead of associated existing basic blocks of the source code such that the predetermined code pieces are positioned to be executed before the associated existing basic blocks of the source code during running of the associated test cases, and wherein the predetermined code pieces and the associated existing basic blocks of the source code are positioned in an alternating pattern within the source code as a result of the insertions.

16. A system, comprising:

a processor; and logic integrated with the processor, executable by the processor, or integrated with and executable by the processor, the logic being configured to:

insert predetermined code pieces before existing code segments of source code, wherein the existing code segments of the source code are configured to, based on the insertions, print function information about associated test cases upon the associated test cases being run;

run the associated test cases;

subsequent to a first change being made to a function of the source code, determine a prioritized subset of the associated test cases, wherein the first change is made in a prolog of the function of the source code; and run the prioritized subset of the associated test cases.

17. The system of claim 16, the logic being further configured to:

run a remainder of the associated test cases after running the prioritized subset of the associated test cases.

18. The system of claim 17, the logic being further configured to:

generate a map recipe based on the function information;

update the map recipe in response to the prioritized subset of the associated test cases being run; and use the updated map recipe to determine a next prioritized subset of the associated test cases to run.

19. The system of claim 16, wherein the first change includes adding a prolog code piece in the prolog of the function of the source code, wherein a second change includes adding an epilog code piece in an epilog of the function of the source code, and wherein a third change includes inserting basic block code pieces in and/or ahead of basic blocks of the function of the source code.

* * * * *